June 29, 1965   R. S. STEWART   3,191,399
CONTROLS FOR HEAT PUMPS HAVING OUTDOOR AIR COILS
Filed Aug. 11, 1964
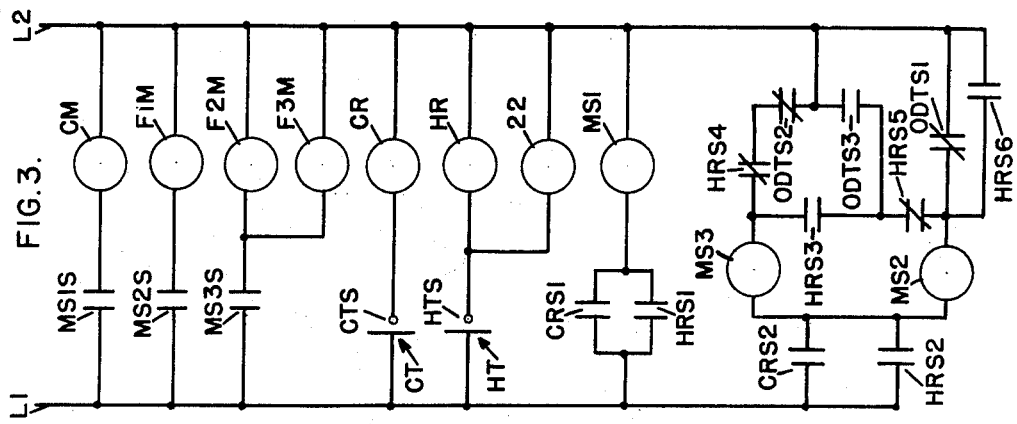
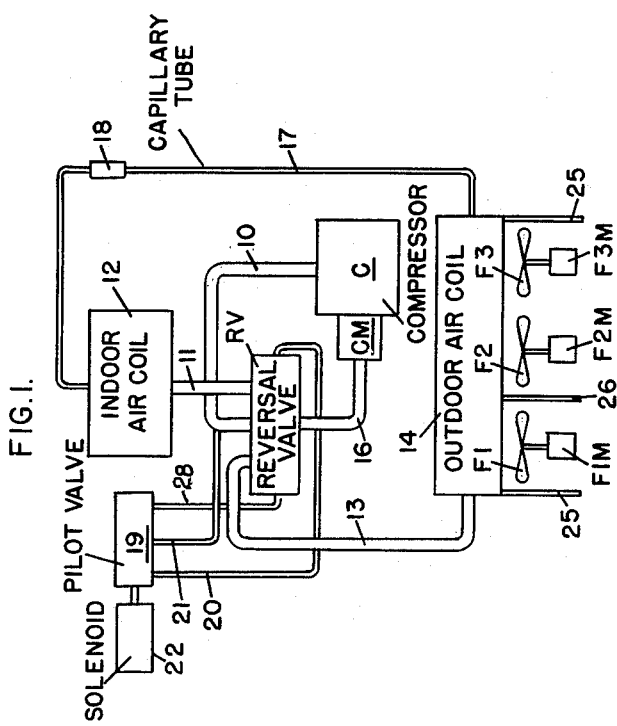
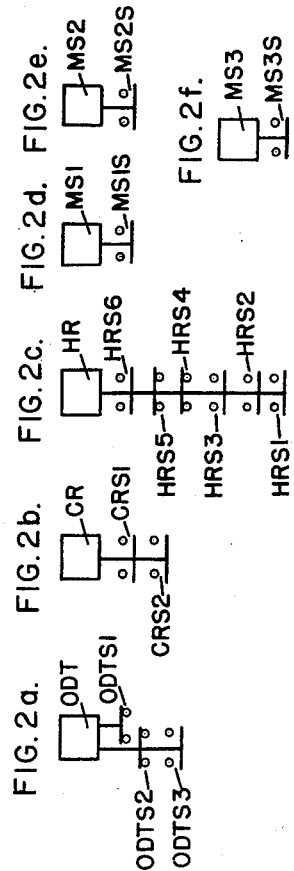
INVENTOR:
ROBERT S. STEWART,
BY Robert J. Palmer
ATTORNEY

United States Patent Office 3,191,399
Patented June 29, 1965

3,191,399
CONTROLS FOR HEAT PUMPS HAVING
OUTDOOR AIR COILS
Robert S. Stewart, Staunton, Va., assignor to Westinghouse Electric Corporation, Pittsburgh, Pa., a corporation of Pennsylvania
Filed Aug. 11, 1964, Ser. No. 388,853
1 Claim. (Cl. 62—160)

This invention relates to thermostatic controls for heat pumps used for cooling or heating indoor air.

A heat pump used for cooling or heating indoor air usually has an indoor coil that operates as an evaporator when air cooling is required, and as a condenser when air heating is required, and has an outdoor coil that operates as a condenser when air cooling is required, and as an evaporator when air heating is required.

When such a heat pump is operated to cool indoor air, at relatively low outdoor temperatures, the condensing pressure may be so low that there is insufficient pressure at the refrigerant expansion means to operate it properly. My U.S. Patent 3,112,620 discloses how condensing pressure can be increased when the outdoor temperature drops. Three fans are used to cool the outdoor coil with outdoor air. On a predetermined drop in outdoor temperature, one fan is turned off. On a further drop in outdoor temperature, the other two fans are turned off, and the one fan is turned back on. Only a single two-stage, outdoor thermostat and two relays are required to operate three fans, two fans or one fan depending on the outdoor temperature. This so-called "low ambient control" is widely used.

When the heat pump is used to heat indoor air, a low ambient control is not required since the condenser is the indoor coil. But, a so-called "high ambient control" is desirable for controlling compressor head pressures. This invention adapts the low ambient control of my patent so that it operates as a high ambient control during air heating operation, as well as a low ambient control during air cooling operation.

An object of this invention is to combine low ambient and high ambient controls of a heat pump.

Another object of this invention is to reduce the number of components required for low and high ambient controls of a heat pump.

This invention will now be described with reference to the annexed drawings, of which:

FIG. 1 is a diagrammatic view of a heat pump embodying this invention;

FIG. 2a is a diagrammatic view of an outdoor thermostat used with the heat pump;

FIG. 2b is a diagrammatic view of a cooling relay used with the heat pump;

FIG. 2c is a diagrammatic view of a heating relay used with the heat pump;

FIG. 2d is a diagrammatic view of a starter for the compressor motor of the heat pump;

FIG. 2e is a diagrammatic view of a starter for one of the three outdoor fans of the heat pump;

FIG. 2f is a diagrammatic view of a starter for the other two outdoor fans of the heat pump, and FIG. 3 is a simplified circuit schematic of the electrical components of the heat pump and their controls.

Referring first to FIG. 1, a hermetic, refrigerant compressor C, driven by an electric motor CM, has its discharge side connected through a tube 10 to a conventional reversal valve RV. The valve RV is connected by tube 11 to one side of indoor air coil 12; is connected by tube 13 to one side of outdoor air coil 14, and by suction gas tube 16 to the motor CM, through which the suction gas passes to cool the compressor motor as is usual with hermetic compressors. The other sides of the coils 12 and 14 are connected by a capillary tube 17 serving as a two-way expansion means, in series with a check-valve 18 such as is disclosed in the U.S. Patent 2,785,540 of G. L. Biehn. The check-valve reduces the refrigerant charge during air heating.

One end of the valve RV is connected by a small tube 28 to one end of a conventional pilot valve 19, the other end of which is connected by a small tube 20 to the other end of the valve RV. The center of the valve 19 is connected by a small tube 21 to the discharge tube 10. The valve 19 is adjusted by a solenoid 22 to admit discharge gas into one or the other end of the reversal valve RV for moving a piston therein which is not shown, to air cooling or air heating positions.

An indoor fan which is not shown, would move indoor air over the indoor air coil 12.

Outdoor air is moved over the outdoor coil 14 by three fans F1, F2 and F3, having electric driving motors F1M, F2M and F3M respectively. End partitions 25, and a partition 26 between the fans F1 and F2, direct air from the fans over the coil 14. The partition 26 prevents recirculation of air between the fans F1 and F2–F3 when F1 or F2 and F3 are turned off.

Referring now to FIGS. 2a–2f, an outdoor thermostat ODT has a first stage with a normally closed switch ODTS1, and has a second stage with a normally closed switch ODTS2 and a normally open switch ODTS3. A cooling relay CR has normally open switches CRS1 and CRS2. A heating relay HR has normally open switches HRS1, HRS2, HRS3 and HRS6, and has normally closed switches HRS4 and HRS5. A compressor motor starter MS1 has a normally open switch MS1S. Fan motor starters MS2 and MS3 have normally open switches MS2S and MS3S respectively.

The switch CRS1 is for energizing the compressor motor starter MS1 when the cooling relay CR is energized, and the switch HRS1 is for energizing the compressor motor starter MS1 when the heating relay HR is energized. The switch CRS2 is for connecting the fan motor starters MS2 and MS3 to the supply line L1 when the cooling relay CR is energized, and the switch HRS2 is for connecting the fan motor starters MS2 and MS3 to the line L1 when the heating relay HR is energized. The switch ODTS1 is for connecting the fan motor starter MS2 to the supply line L2 when the outdoor temperature is above 75° F., during cooling operation. The switch HRS6 is for connecting the starter MS2 to the line L2 when the heating relay HR is energized. The switches ODTS2 and HRS2 are for connecting the fan motor starter MS3 to the line L2 when the outdoor temperature is above 60° F., during cooling operation. The switches ODTS3 and HRS3 are for connecting the fan motor starter MS3 to L2 when the outdoor temperature is below 60° F., during heating operation, and the switches ODTS3 and HRS5 are for connecting the starter MS3 to the line L2 when the outdoor temperature is below 60° F., during cooling operation.

Referring now to FIG. 3, the compressor motor CM is connected through the switch MS1S to electric supply lines L1 and L2. The fan motor F1M is connected through the switch MS2S to the supply lines. The fan motors F2M and F3M are connected in parallel, and are connected through the switch MS3S to the supply lines. The cooling relay CR is connected through normally open switch CTS of cooling control thermostat CT to the supply lines. The heating relay HR, connected in parallel with the solenoid 22, is connected through normally open switch HTS of heating control themostat HT to the supply lines. The compressor motor starter MS1 is connected through the switches CRS1 and HRS1 which are connected in parallel, to the supply lines. The fan motor starter MS3 is connected in one path through the switch CRS2 shunted by the switch HRS2, the switch HRS4 and the switch ODTS2, in series to the supply lines, and in another path through the switch CRS2 shunted by the switch HRS2, and the switches HRS3 and ODTS3, in series to the supply lines. The fan motor starter MS2 is connected in one path through the switch CRS2 shunted by the switch HRS2, and the switch ODTS1 shunted by the switch HRS6, in series to the supply lines, and in another path through the switch CRS2 shunted by the switch HRS2, and the switches HRS5 and ODTS3, in series, to the supply lines.

*Air cooling operation*

Normally, the reversal valve RV is in its air cooling position. When the thermostat CT calls for cooling, it closes its switch CTS which energizes the cooling relay CR. The relay CR then closes its switches CRS1 and CRS2. The closed switch CRS1 energizes the compressor motor starter MS1 which closes its switch MS1S and energizes the compressor motor CM. The closed switch CRS2 energizes the fan motor starter MS3 through the closed switches HRS4 and ODTS2, and energizes the fan motor starter MS2 through the closed switch ODTS1. The fan motor starters MS2 and MS3 close their switches MS2S and MS3S respectively. The closed switch MS2 starts the fan motor F1M. The closed switch MS3S starts the fan motors F2M and F3M.

Discharge gas from the compressor C passes through the tube 10, the reversal valve RV and the tube 13 into the outdoor coil 14 operating as a condenser. Refrigerant liquid from the coil 14 flows through the capillary tube 17 and the restrictor valve 18 and is expanded in the indoor coil 12 operating as an evaporator. Suction gas passes from the coil 12 through the tube 11, the reversal valve RV and the tube 16 and compressor motor CM to the compressor C.

When the outdoor temperature decreases, for example, below 75° F., so that the condensing pressure is too low to properly operate the capillary tube 17 as an expansion means, the switch ODTS1 of the outdoor thermostat ODT opens, deenergizing the fan motor starter MS2 which opens its switch MS2S, stopping the fan motor F1M. If the outdoor temperature decreases, for example, below 60° F., the switch ODTS2 of the outdoor thermostat ODT opens, deenergizing the fan motor starter MS3 which opens its switch MS3S, stopping the fan motors F2M and F3M. At the same time the switch ODTS3 closes, and reenergizes the fan motor starter MS2 through the closed switches HRS5 and CRS2. This low ambient control is that disclosed in my said patent.

*Air heating operation*

When the heating control thermostat HT calls for heat, it closes its switch HTS which energizes the heating relay HR. The relay HR then closes its switches HRS1, HRS2, HRS3 and HRS6, and opens it switches HRS4 and HRS5. The closed switch HRS1 energizes the compressor motor starter MS1 which closes its switch MS1S, starting the compressor motor CM. Assuming that the outdoor temperature is below 60° F., so that the switch ODTS3 is closed, the closed switch HTS2 energizes the fan motor starter MS3 through the now closed switches ODTS3 and HRS3. The fan motor starter MS2 is energized through the now closed switches HRS2 and HRS6. The starter MS2 closes its switch MS2S, starting the fan motor F1M. The starter MS3 closes its switch MS3S starting the fan motors F2M and F3M.

The closed switch HTS of the heating thermostat HT also energizes the solenoid 22 which adjusts the pilot valve 19 to switch the reversal valve RV to its air heating position. Discharge gas from the compressor flows through the tube 10, the reversal valve RV and the tube 11 into the indoor air coil 12 operating as a condensor. Refrigerant liquid from the coil 12 flows through the restrictor valve 18 and the capillary tube 17 and is expanded into the outdoor coil 14 operating as an evaporator. Suction gas flows from the coil 14 through the tube 13, the reversal valve RV and the tube 16 and motor CM to the compressor C.

When the outdoor temperature increases above 60° F., the switch ODTS3 of the outdoor thermostat ODT opens and deenergizes the fan motor starter MS3 which opens its switch MS3S stopping the fan motors F2M and F3M. This prevents excessive compressor head pressure at high outdoor ambients.

Thus, a low ambient control and a high ambient control are combined.

What is claimed is:

In a heat pump having an outdoor air coil, an indoor air coil, a refrigerant compressor, refrigerant reversal means and two-way expansion means connected in a refrigeration circuit, means for adjusting said reversal means to route refrigerant from said compressor to said outdoor coil to operate said outdoor coil as a condenser and said indoor coil as an evaporator for air cooling, or to route refrigerant from said compressor to said indoor coil to operate said indoor coil as a condenser and said outdoor coil as an evaporator for air heating operation, first, second and third fans for moving outdoor air over said outdoor coil, said first, second and third fans having first, second and third electric driving motors respectively, a two-stage outdoor thermostat having a first switch that is closed when the outdoor air is above a first predetermined temperature, having a second switch that is closed and a third switch that is open when the outdoor air is below a second predetermined temperature lower than said first temperature, a cooling control thermostat and a heating control thermostat, the combination of a cooling relay that is energized when said cooling thermostat calls for cooling, a heating relay that is energized when said heating thermostat calls for heating, said cooling relay having a switch that is closed when said cooling relay is energized, said heating relay having first, second and fifth, normally open switches that are closed, and having third and fourth, normally closed switches that are opened when said heating relay is energized, means including said switch of said cooling relay, said third switch of said heating relay and said second switch of said outdoor thermostat for energizing said second and third motors, and including said switch of said cooling relay and said first switch of said outdoor thermostat for energizing said first motor when the outdoor temperature is above said first temperature and said cooling relay is energized, means including said switch of said cooling relay, said fourth switch of said heating relay and said third switch of said outdoor thremostat for energizing said first motor when the outdoor temperature is below said second temperature and said cooling relay is energized, and means including said first and second switches of said heating relay and said third switch of said outdoor thermostat for energizing said second and third motors when said heating relay is energized and when the outdoor temperature is below said second temperature, and including said first and fifth switches of said heating relay for energizing said first motor when said heating relay is energized, said third switch of said outdoor thermostat opening and deenergizing said second and third motors when the outdoor temperature rises above said second temperature while said heating thermostat is calling for heating.

References Cited by the Examiner

UNITED STATES PATENTS 3,112,620   12/63   Stewart _____ 62—183
3,138,941    6/64   Jensen _____ 62—184

WILLIAM J. WYE, *Primary Examiner.*